(12) United States Patent
Wald

(10) Patent No.: US 11,914,488 B2
(45) Date of Patent: Feb. 27, 2024

(54) BLOCKCHAIN ENABLED FAULT TOLERANCE

(71) Applicant: Visa International Service Association, San Francisco, CA (US)

(72) Inventor: Jerry Wald, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/774,160

(22) PCT Filed: Nov. 6, 2019

(86) PCT No.: PCT/US2019/059996
§ 371 (c)(1),
(2) Date: May 4, 2022

(87) PCT Pub. No.: WO2021/091548
PCT Pub. Date: May 14, 2021

(65) Prior Publication Data
US 2022/0276940 A1 Sep. 1, 2022

(51) Int. Cl.
*G06F 11/00* (2006.01)
*G06F 11/20* (2006.01)

(52) U.S. Cl.
CPC ...... *G06F 11/2025* (2013.01); *G06F 11/2094* (2013.01); *G06F 2201/805* (2013.01)

(58) Field of Classification Search
CPC ........ G06F 11/14; G06F 11/20; G06F 11/202; G06F 11/2023; G06F 11/2025; G06F 11/2038; G06F 11/2094; G06F 11/07–0745; G06F 11/102; G06F 11/1076; G06F 11/1446; G06F 11/1666; G06F 11/2053; G06F 11/2056
See application file for complete search history.

(56) References Cited

U.S. PATENT DOCUMENTS

| | | |
|---|---|---|
| 2016/0260169 A1 | 9/2016 | Arnold et al. |
| 2017/0075941 A1 | 3/2017 | Finlow-Bates |
| 2019/0018984 A1 | 1/2019 | Setty et al. |

(Continued)

FOREIGN PATENT DOCUMENTS

| | | |
|---|---|---|
| CN | 108694095 A | 10/2018 |
| CN | 110417843 A | 11/2019 |

*Primary Examiner* — Michael Maskulinski
(74) *Attorney, Agent, or Firm* — The Webb Law Firm

(57) ABSTRACT

Provided is a system, method, and computer program product for handling fault tolerance in a blockchain enabled network system. The system includes a computing system with at least one of a plurality of processors arranged as an active processor node, at least one data storage device including a first ledger corresponding to a first blockchain and a second ledger corresponding to a second blockchain, at least one standby processor node, and at least one standby data storage device. The at least one active processor node is programmed or configured to analyze and record blocks corresponding to data received through the network system on the first ledger and the second ledger such that the first ledger and the second ledger have matching data, detect at least one failure or anticipated failure, and in response to detecting the at least one failure or anticipated failure, generating a switch-over command.

17 Claims, 8 Drawing Sheets

(56) References Cited

U.S. PATENT DOCUMENTS

| | | |
|---|---|---|
| 2019/0238486 A1 | 8/2019 | Zizka |
| 2019/0288993 A1 * | 9/2019 | Lin |
| 2020/0117540 A1 * | 4/2020 | Boehm ............... G06F 11/1016 |
| 2021/0026844 A1 * | 1/2021 | Koide ................... H04L 9/3239 |

* cited by examiner

BLOCKCHAIN ENABLED FAULT TOLERANCE

CROSS-REFERENCE TO RELATED APPLICATION

This application is the United States national phase of International Application No. PCT/US2019/059996 filed Nov. 6, 2019, the entire disclosure of which is hereby incorporated by reference in its entirety.

BACKGROUND

1. Technical Field

Provided are non-limiting embodiments or aspects of a system and methods used to produce and operate a blockchain enabled fault tolerant system.

2. Technical Considerations

Sophisticated distributed and centralized control and network processing systems may achieve a requisite level of fault tolerance through the use of component and/or system redundancy, the use of self-checking processor pairs at one or more levels of a system architecture, or varying combinations of each. Such approaches to fault tolerance are resource intensive. The introduction of blockchain technology introduces new fault tolerance considerations.

Multiple approaches now address blockchain Byzantine fault tolerance, methods used to address when a blockchain comprises multiple nodes that may have one or more faulty processes that affect arriving at a consensus needed to write a transaction on the blockchain distributed ledger. Such methods do not address the fault tolerance of the network if, and when, a blockchain enabled system failure occurs or when such a system is mission critical and cannot rely on majority-of-actors based consensus or the time taken to perform proofs-of-work.

The deployment of blockchains may also enable the achievement of a fault tolerant system with fewer active resources insofar as one relies on a block on a blockchain to archive accurate and immutable data.

SUMMARY

Accordingly, and generally, provided are improved apparatus, systems and methods embodying a blockchain enabled fault tolerant system. Provided are appraratus, systems and methods for a network system comprised of first, second, and third processor nodes and blockchain distributed ledger pairs wherein the system is capable of detecting a failure condition and reconfiguring itself using available second and third processor nodes and blockchain distributed ledger pairs.

According to non-limiting embodiments or aspects, provided is a network system for handling fault tolerance in a blockchain enabled network system, comprising: a computing system programmed or configured with at least one of a plurality of processors arranged as an active processor node in the network system; at least one data storage device comprising a first ledger corresponding to a first blockchain and a second ledger corresponding to a second blockchain; at least one standby processor node in communication with the at least one data storage device; at least one standby data storage device; and the at least one active processor node programmed or configured to: analyze and record blocks corresponding to data received through the network system on the first ledger and the second ledger, such that the first ledger and the second ledger have matching data; detect at least one failure or anticipated failure of the at least one active processor node, the at least one active data storage device, or any combination thereof; and in response to detecting the at least one failure or anticipated failure, generating a switch-over command configured to cause the computing system to perform at least one of the following: switch from the at least one active processor node to the at least one standby processor node such that the at least one standby processor node records the blocks received through the network system and is activated as a new at least one active processor node, switch from the active data storage device to the standby data storage device, or any combination thereof.

In non-limiting embodiments or aspects, the network system further comprises: creating new multi-party encryption keys in conjunction with a switch-over command; and in response to creating the new multi-party encryption keys, distributing shares of the new multi-party encryption keys among the active processor node, standby processor node, active data storage device, and standby data storage device to establish a secure, reconfigured trust network system. In non-limiting embodiments or aspects, the method further comprises comparing and analyzing two blocks of a ledger to detect a failure or anticipated failure of the active processor node, the active storage device, or any combination thereof. In non-limiting embodiments or aspects, the method further comprises writing a last trusted block of data to the active data storage device of the reconfigured network system in response to a network system reconfiguration. In non-limiting embodiments or aspects, the command instructs the network system's configurations, operations, control, processing, network functions, or any combination thereof.

According to non-limiting embodiments or aspects, provided is a computer program product comprising at least one non-transitory computer-readable medium including program instructions that, when executed, causes a blockhain enabled network system to: detect a failure comprising at least one of the following: an active processor node failure, a data storage device failure, a ledger failure, or any combination thereof; and in response to detecting the failure, issue a command to a standby processor node to cause the standby processor node to activate as an active processor node and/or to cause an standby data storage device activate as an active data storage device. In non-limiting embodiments or aspects, two blocks of a data storage device are compared and analyzed to detect a failure or anticipated failure of the, active processor node, active data storage device, or any combination thereof.

In non-limiting embodiments or aspects, the blocks written to each block of the active data storage device for the same time interval are compared and analyzed to detect a failure or anticipated failure of the active processor node or data storage device. In non-limiting embodiments or aspects, upon a network system reconfiguration, a last trusted block of data is written to the active data storage device of the reconfigured blockchain enabled network system. In non-limiting embodiments or aspects, the program instructions generate or perform the blockchain enabled network system's configurations, operations, control, processing, network functions, or any combination thereof. In non-limiting embodiments or aspects, a third processor from among the plurality of processors becomes configured as a standby processor node, a third data storage device from among the plurality of data storage devices becomes configured as a standby data storage device, and multi-party encryption keys be computed and shared among the active and standby processor nodes and data storage devices of the reconfigured network system to re-establish and maintain trust among the processor nodes and data storage devices comprising the reconfigured blockchain enabled network system.

Further non-limiting embodiments or aspects are set forth in the following numbered clauses.

Clause 1: A network system for handling fault tolerance in a blockchain enabled network system, comprising: a computing system programmed or configured with at least one of a plurality of processors arranged as an active processor node in the network system; at least one data storage device comprising a first ledger corresponding to a first blockchain and a second ledger corresponding to a second blockchain; at least one standby processor node in communication with the at least one data storage device; at least one standby data storage device; and the at least one active processor node programmed or configured to: analyze and record blocks corresponding to data received through the network system on the first ledger and the second ledger, such that the first ledger and the second ledger have matching data; detect at least one failure or anticipated failure of the at least one active processor node, the at least one active data storage device, or any combination thereof; and in response to detecting the at least one failure or anticipated failure, generating a switch-over command configured to cause the computing system to perform at least one of the following: switch from the at least one active processor node to the at least one standby processor node such that the at least one standby processor node records the blocks received through the network system and is activated as a new at least one active processor node, switch from the active data storage device to the standby data storage device, or any combination thereof.

Clause 2: The network system of clause 1, wherein the first blockchain and the second blockchain are separate forms of the same blockchain.

Clause 3: The network system of clauses 1 or 2, wherein the data received from the network system relates to a network system's configurations, operations, control, processing, network functions, or any combination thereof.

Clause 4: The network system of any of clauses 1-3, wherein multi-party encryption keys are created and shared among the active processor, standby processor, first data storage device, and standby data storage device to establish a secure trust network system.

Clause 5: The network system of any of clauses 1-4, wherein new multi-party encryption keys are created in conjunction with a switch-over command, in response to which portions of keys are distributed among activated and configured active and standby processors and data storage devices comprising the reconfigured network system.

Clause 6: The network system of any of clauses 1-5, wherein two blocks of a ledger are compared and analyzed to detect a failure or anticipated failure of the network system or the at least one active processor node.

Clause 7: The network system of any of clauses 1-6, wherein the blocks written to each block of the first and second ledgers for the same time interval are compared and analyzed to detect a failure or anticipated failure of the active processor node or the active data storage device.

Clause 8: The network system of any of clauses 1-7, wherein upon a network system reconfiguration, a last trusted block of data is written to the first and second ledger of the data storage device of the reconfigured network system.

Clause 9: A method comprising: analyzing, with at least one active processor node, a network system and active processor data; detecting, with at least one active processor node, at least one failure comprising at least one of the following: an occurring or anticipated system failure, an occurring or anticipated active processor node failure, an occurring or anticipated active data storage device failure, or any combination thereof; in response to detecting the at least one failure, issuing, with at least one processor node, a command to cause at least one of the following: a system shut down, a switch-over from a failed or anticipated to fail active processor node to a standby processor that activates as a new active processor node, a switch-over from a failed or anticipated to fail active data storage device to a standby data storage device that activates as an active data storage device, or any combination thereof; and in response to the command, at least one of the following: configuring a third processor of a plurality of processors as a standby processor node, configuring a third data storage device among a plurality data storage devices as a standby data storage device, or any combination thereof.

Clause 10: The method of clause 9, wherein multi-party encryption keys are created and shared among the active processor node, standby processor node, active data storage device, and standby data storage device to establish a secure, reconfigured trust network system.

Clause 11: The method of clauses 9 or10, further comprising: creating new multi-party encryption keys in conjunction with a switch-over command; and in response to creating the new multi-party encryption keys, distributing shares of the new multi-party encryption keys among the active processor node, standby processor node, active data storage device, and standby data storage device to establish a secure, reconfigured trust network system.

Clause 12: The method of any of clauses 9-11, further comprising comparing and analyzing two blocks of a ledger to detect a failure or anticipated failure of the active processor node, the active storage device, or any combination thereof.

Clause 13: The method of any of clauses 9-12, wherein blocks written to each block of the first ledger and the second ledger for the same time interval are compared and analyzed to detect the failure.

Clause 14: The method of any of clauses 9-13, further comprising writing a last trusted block of data to the active data storage device of the reconfigured network system in response to a network system reconfiguration.

Clause 15: The method of any of clauses 9-14, wherein the command instructs the network system's configurations, operations, control, processing, network functions, or any combination thereof.

Clause 16: A computer program product comprising at least one non-transitory computer-readable medium including program instructions that, when executed, causes a blockhain enabled network system to: detect a failure comprising at least one of the following: an active processor node failure, a data storage device failure, a ledger failure, or any combination thereof; and in response to detecting the failure, issue a command to a standby processor node to cause the standby processor node to activate as an active processor node and/or to cause a standby data storage device to activate as an active data storage device.

Clause 17: The computer program product of clause 16, wherein two blocks of a data storage device are compared and analyzed to detect a failure or anticipated failure of the active processor node, active data storage device, or any combination thereof.

Clause 18: The computer program product of clauses 16 or 17, wherein the blocks written to each block of the active data storage device for the same time interval are compared and analyzed to detect a failure or anticipated failure of the active processor node or data storage device.

Clause 19: The computer program product of any of clauses 16-18, wherein upon a network system reconfiguration a last trusted block of data is written to the active data storage device of the reconfigured blockchain enabled network system.

Clause 20: The computer program product of any of clauses 16-19, wherein the program instructions generate or perform the blockchain enabled network system's configurations, operations, control, processing, network functions, or any combination thereof.

Clause 21: The computer program product of any of clauses 16-20, wherein a third processor from among the plurality of processors becomes configured as a standby processor node, that a third data storage device from among the plurality of data storage devices becomes configured as a standby data storage device, and multi-party encryption keys be computed and shared among the active and standby processor nodes and data storage devices of the reconfigured network system to re-establish and maintain trust among the processor nodes and data storage devices comprising the reconfigured blockchain enabled network system.

According to non-limiting embodiments or aspects, provided is a blockchain enabled fault tolerant system that uses multiparty encryption and related protocols to ensure network security and support secure network reconfiguration when failure conditions warrant.

BRIEF DESCRIPTION OF THE DRAWINGS

The drawings incorporated herein illustrate one or more non-limiting embodiments or aspects of the blockchain enabled fault tolerant system apparatus, systems and methods and help explain different aspects of the one or more non-limiting embodiments or aspects of the same. As such, the drawings are not be viewed as limiting any one aspect of any non-limiting embodiment or aspect of the blockchain enabled fault tolerant system's apparatus, systems and methods. In the drawings.

DETAILED DESCRIPTION

Figure 1:
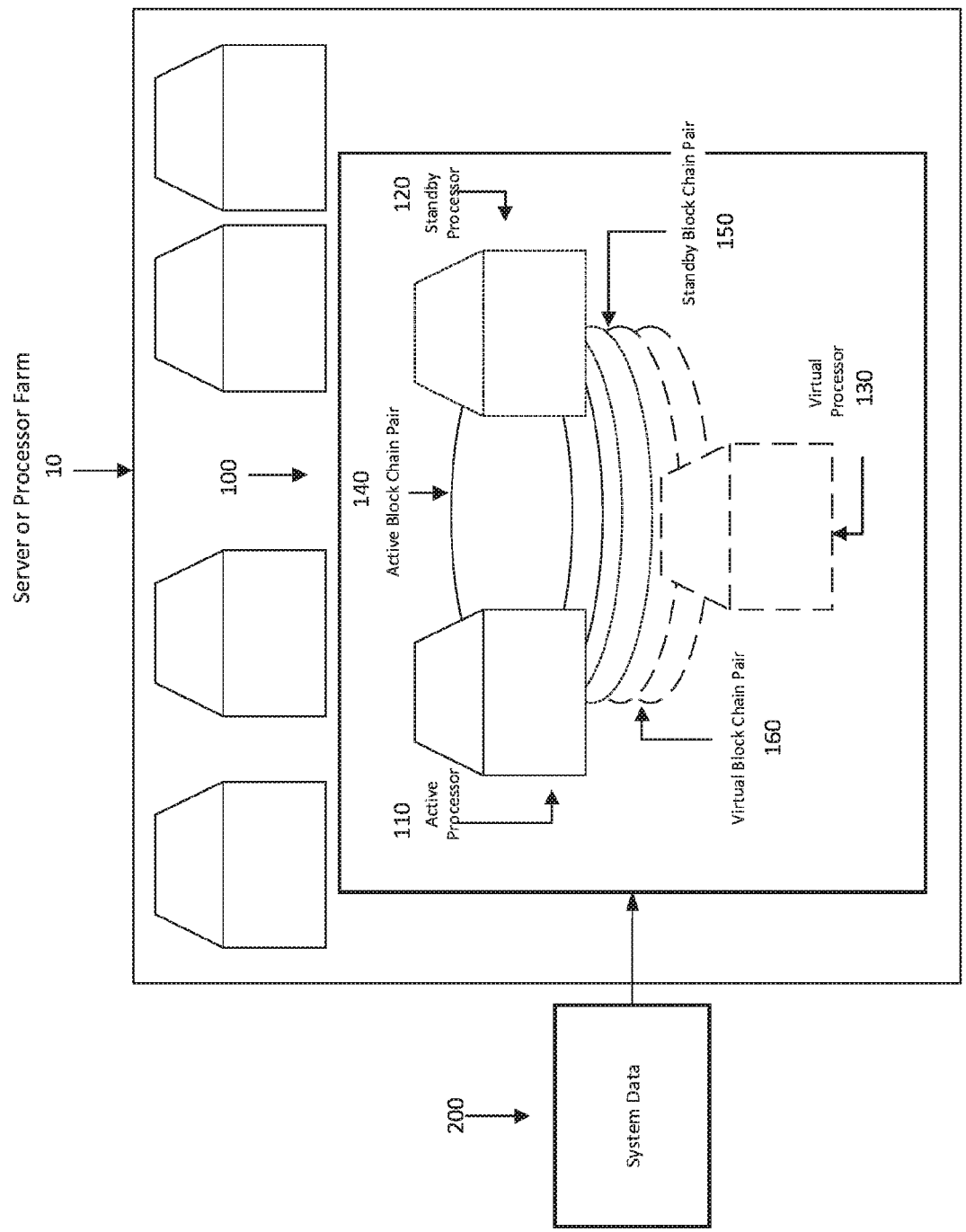
FIG. 1 is a schematic view of non-limiting embodiments or aspects of a blockchain enabled fault tolerance system according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to expressions of the disclosure as it is oriented in the drawing figures. However, it is to be understood that the non-limiting embodiments or aspects of the disclosure may assume various alternative variations and step sequences, except where expressly specified to the contrary. It is also to be understood that devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the term "blockchain enabled network system" refers to a computing system comprised of active and standby processor nodes and data storage devices from among a plurality of processors and data storage devices.

As used herein, the terms "communication" and "communicate" refer to a receipt or transfer of one or more signals, messages, commands, or other type of data. For one unit (e.g., any device, system, processor, server, distributed ledger, or components thereof) to be in communication with another unit means that the one unit is able to directly or indirectly receive data from and/or transmit data to another unit. This may refer to a direct or indirect connection that is wired, optical, and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

Non-limiting embodiments of the present disclosure are directed to a blockchain enabled network system, method, and computer program product for implementing a blockchain enabled fault tolerant control or processing system or any combination thereof. As an example, such a system may control an industrial, commercial, or residential process, or be used to process a transaction, examples of which, but are not limited to, a purchase transaction, an insurance transaction, a banking transaction, a payment transaction, or a business transaction. By utilizing blockchain technology and by maintaining permissions for different participants in the blockchain enabled network, a technologically improved network architecture is provided that allows for transparency, consistency, and ease of use.

As used herein, the term "blockchain" refers to a blockchain, a blockchain or a distributed ledger or functionally equivalent memory system or fabric that, as a non-limiting example, may be used as a relational database, a mass storage memory system, a data warehouse, or any combination thereof.

As used herein, the term "block" refers to a block on a distributed ledger, a record stored in memory database, storage medium or fabric, such as a distributed ledger, or any combination thereof.

As is used herein, the term "data storage device" comprises a first ledger corresponding to a first blockchain and a second ledger corresponding to a second ledger used to interconnect processors comprising a centralized or distributed blockchain enabled network system. In the specification material that follows, the data storage device is referred to as a "ledger pair." As used throughout the below disclosure, a first ledger pare is considered to be an active data storage device, a second ledger pair is considered to be a standby data storage device, and a third ledger pair is considered to be a processor among the plurality of data storage devices that may be become configured to become part of the blockchain enabled network system (defined below) if the network system detects or anticipates a network system or active data storage device failure.

As use herein, the term "plurality of data storage devices" refers to at least one data storage device within a centralized or distributed, fit-for-purpose cloud or private server farm, computer cluster, cloud or private network, or any combination thereof. The at least one data storage device comprising a plurality of data storage devices may establish trusted relationships among at least one data storage device and at least one of a plurality of processors to form ad hoc peer to peer communications. In addition, each data storage device among the plurality of data storage devices may have a registry, a list of certificates of all processors, and ledger pairs that are eligible to be added to or removed from a network system.

As used herein, the term "processor" or "processor node" refers to a processing node on a blockchain or one or more processors or servers of a distributed or centralized network system, server farm, a plurality of processors, computer cluster, cloud-computing network, business network, or any combination thereof. As used throughout the below disclosure, a first processor is considered to be an active processor node, a second processor is considered to be a standby processor node, and a third processor is considered to be a processor among the plurality of processors that may be become configured to become part of the blockchain enabled network system (defined below) if the network system detects or anticipates a network or active processor node or data storage device failure.

As used herein, the term "plurality of processors" refers to a centralized or distributed, fit-for-purpose cloud or private server farm, computer cluster, cloud or private network, or any combination thereof. At least one processor of the plurality of processors may establish trusted relationships among at least one of the plurality of processors and at least one data storage device of a plurality of data storage devices, enabling them to form ad hoc peer to peer communications. In addition, each processor may have a registry, a list of certificates of all processors, and ledger pairs that are eligible to be added to or removed from a network system.

As used herein, the term "network system" refers to a fit-for-purpose processor or server configuration, or a cloud computing server or processor configuration, or any combination thereof, wherein the term "fit-for-purpose" refers to a processing system configuration, architecture, or deployment that is capable of performing one or more specific or well defined control, processing, and/or network system functions.

As used herein, the term "network system data" or simply "data" refers to data related to a network system's operations, control, processing, management, and/or other network functions.

As used herein, a "failure condition" refers to the detection of an actual failure or of an impending failure that satisfies predefined failure criteria or any combination thereof.

As used herein, a "switch-over command" refers to at least one processing command or instruction that leads to the reconfiguration of a network system, a network processor or processors, a distributed ledger or pairs of ledgers, or any combination thereof.

As used herein, a "shared secret" refers to a secret value or datum shared between or among multiple processors or ledgers, for example, a cryptographic key divided such that multiple processors or ledgers (or any combination thereof) each possess a fraction of that cryptographic key.

As used herein, a "secret share" refers to a value or datum derived from a shared secret that a party or ledger possesses. A secret share when combined with a number of other secret shares may reproduce the shared secret.

As used herein, a "cryptographic key" refers to a string of bits used by a cryptographic algorithm used to securely encrypt or decrypt text, information, and/or data so that it is no longer human- or machine-readable.

As used herein, the terms "encryption" and "decryption" refer to a process of encoding and decoding text, information, and/or data, respectively, in such a way that only authorized parties can access the text, information, and/or data and read it.

As used herein, the term "configuration" refers to the parameters and initial settings for a computer program(s) required to set up, boot up, and initiate control or processing system operations. The parameters and initial settings may comprise a "configuration file" as used herein. Some computer systems may only read their configuration files at startup while others may periodically assess configuration files for changes.

As used herein, the term "activation" refers to starting, initiating, or booting-up a processor node or ledger pair.

As used herein, the term "deactivation" refers to turning off or safely failing a processor node, data storage or ledger pair, or any combination thereof.

According to non-limiting embodiments or aspects, FIG. 1 depicts a representative blockchain enabled fault tolerant network system 100 that is established within a plurality of processors 10. At any one time, the blockchain enabled fault tolerant network system 100 comprises three processors and three ledger pairs. There is a first processor node 110, a second processor node 120, and a third processor node 130. These processor nodes may store data on and communicate using a ledger fabric comprising a first ledger pair 140, or a second ledger pair 150 and a third ledger pair 160. Taken together, these processors and ledger pairs comprise a dynamic, trusted peer-to-peer blockchain enabled network, of which only one processor node and ledger pair may be active at any one time, thereby saving energy, computing, and database resource utilization at any one time.

Trust among the components comprising network system 100 at any one time may be established and maintained using multi-party encryption generated shared keys. The use of such keys allows networked processor nodes and ledger pairs to be added and removed as required and secures the system so that it cannot be compromised at a single point of attack or by a simple interception of messages. Because an encryption key is split into shares distributed among the currently designated first, second, and third processor nodes and ledger pairs, it requires an attacker to hack into multiple components to construct the encryption key. Furthermore, the key and its shares may be regenerated and redistributed any time a blockchain enabled network component is removed from, and a new component added to, blockchain enabled network system 100. This may occur in a secure manner whenever a new processor node or a new ledger pair is activated within, or as part of, the blockchain enabled network system.

The first processor node 110 of blockchain enabled network system 100 receives network system data 200. Network system data may comprise network system configuration data, operational data, health data, or any combination thereof. The configuration data may specify the processors within the plurality of processors 10 that are to serve as first processor node 110, the second processor node 120, and the third processor node 130. Similarly, it may specify the ledgers that are to serve as ledger pairs 140, 150, and 160.

The configuration data may further specify parameters associated with network system operations. These parameters may themselves define what constitutes a normal or stable operation, what operational set points are used, including upper and lower limits an operation must be performed within (such as six sigma determined upper or lower limits or some other statistically determined or absolute limits).

The blockchain enabled network system 100 operational data may comprise command functions used to control or manage a process as well as the data received from sensors or monitors measuring process variables that may be compared to upper and lower limits. They may also comprise instructions used to manage and control the flow of processing and/or control system information.

The system health monitoring data may comprise the data used to monitor network system resource utilization, performance, and operational conditions. This may include whether monitored data falls within acceptable operating parameters. Examples may include CPU usage and frequency, fee space, process, and/or control related conditions and their trends and changes over time. Further examples may include, but are not limited to, operational and environmental temperatures, voltages, upload, and download rates.

Figure 2:
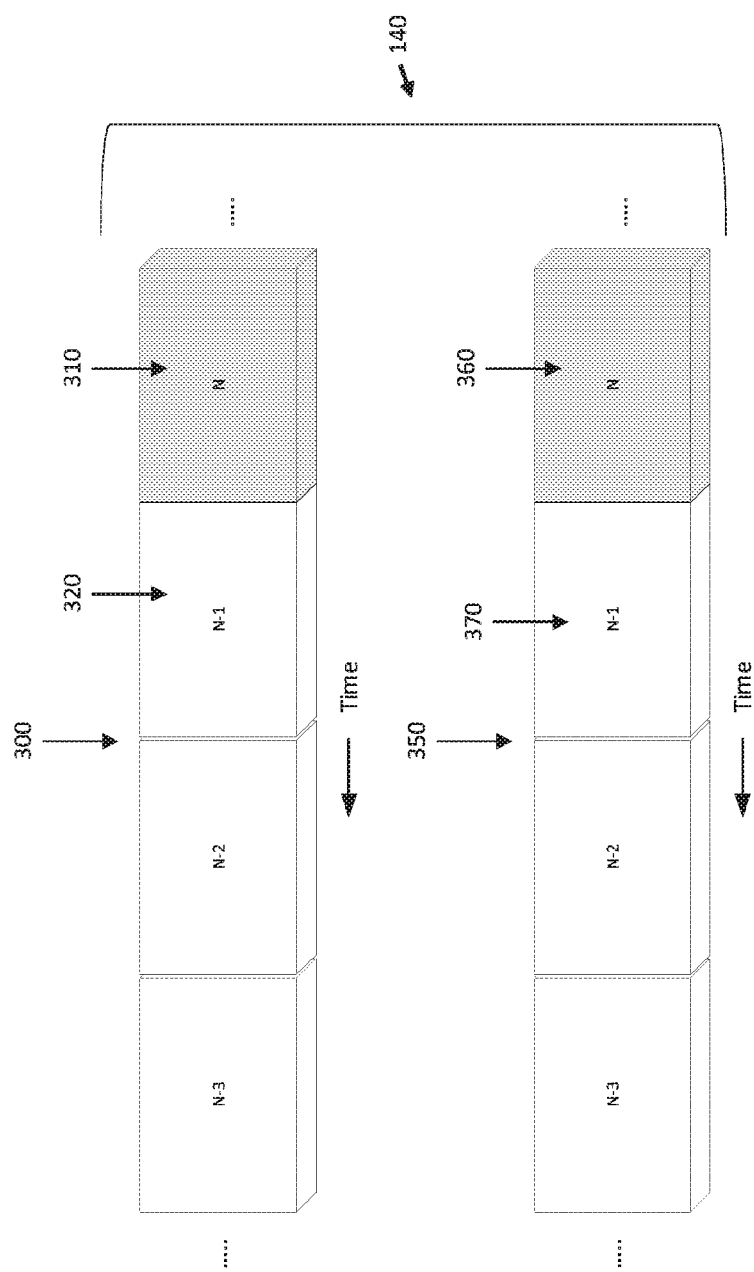
FIG. 2 is a schematic view of non-limiting embodiments or aspects of a distributed ledger in a blockchain enabled fault tolerance system according to the principles of the present disclosure.

According to non-limiting embodiments or aspects, FIG. 2 illustrates how configuration blockchain enabled network system data and health monitoring data are written to the first ledger pairs at predefined time intervals t. FIG. 2 illustrates two ledgers 300 and 350 comprising the first ledger pair 140. A new block is written to each ledger at each t interval. Illustratively, blocks 310 and 360 are written at time interval t onto ledgers 300 and 350, respectively, wherein blocks 320 and 370 were written onto ledgers 300 and 350 during the previous interval of time, respectively.

FIG. 2 further expresses that at each interval t, the same information is written as a block on ledgers 300 and 350 comprising ledger pair 140. For example, an identical block N is written to ledgers 300 and 350 as blocks 310 and 360 at interval t. Relatedly, an identical block N-1 was written to the two ledgers as blocks 320 and 370 during the previous time interval, wherein identical blocks N-2 and N-3 were written to each ledger for the two time intervals preceding that.

Figure 3:
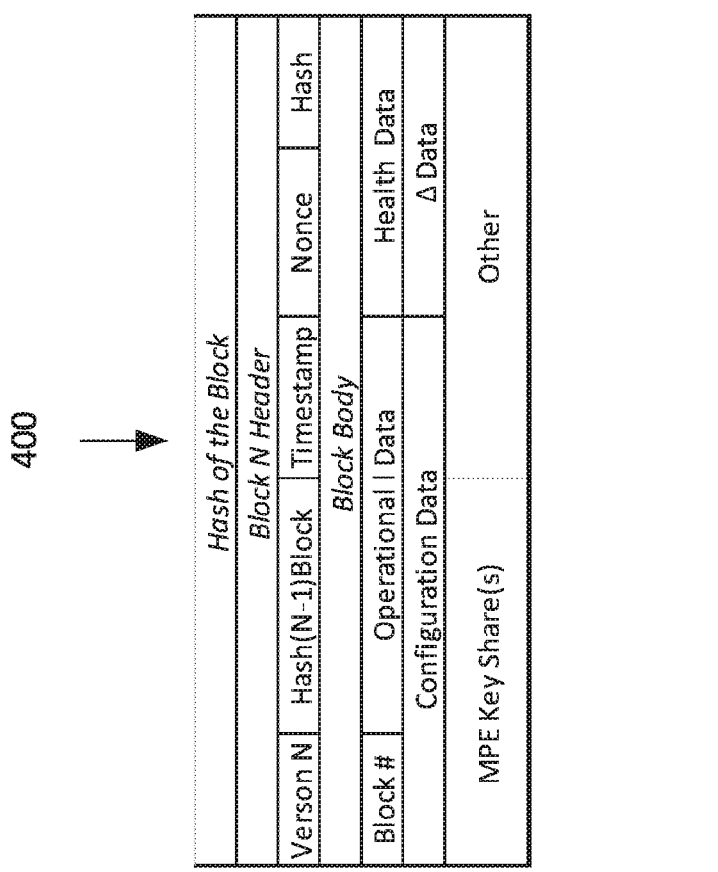
FIG. 3 is a schematic view of non-limiting embodiments or aspects of a distributed ledger block in a blockchain enabled fault tolerance system according to the principles of the present disclosure.

According to non-limiting embodiments or aspects, FIG. 3 illustrates a structure of a block 400 which may represent the structure of the N blocks 310 and 360. While the figure illustrates the structure of the N blocks, it is noted that the same structure applies to each block of a ledger. In FIG. 2, therefore, this is the structure of the blocks labeled N-1, N-2 and N-3 of the ledgers 300 and 350 that make up the first ledger pair 140.

Each N block is hashed. Each comprises a block N header that may include a version identifier, a hash of the N-1 block, a time stamp representing the interval t when it was created, a nonce, and a hash used to hash the block. The body of each block N may comprise a block number, and configuration, operational and health data associated with interval t, detected data changes (shown as "Δ Data" in the Figure), a multi-party encryption key share(s), and a place holder for other data that a system designer may choose to include.

Figure 4:
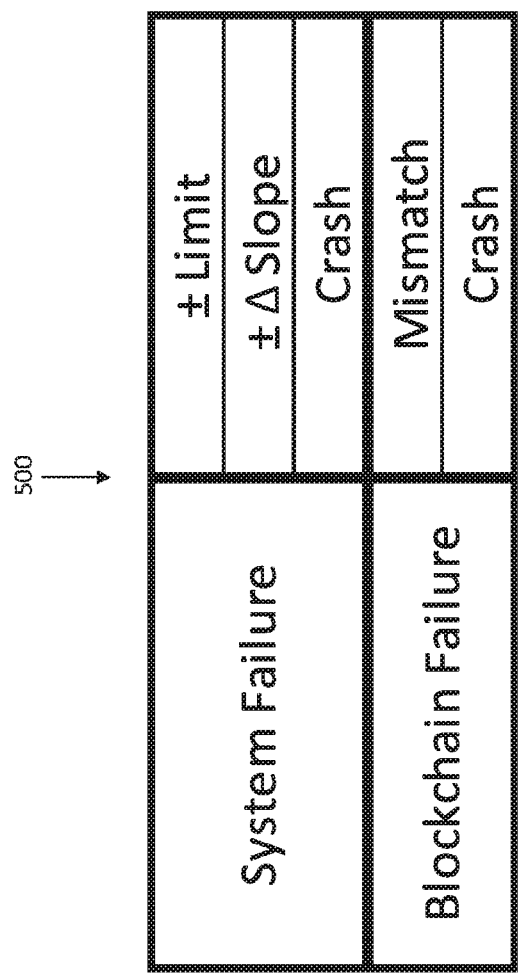
FIG. 4 is a schematic view of non-limiting embodiments or aspects of system failures in a blockchain enabled fault tolerance system according to the principles of the present disclosure.

According to non-limiting embodiments or aspects, FIG. 4 depicts a failure table 500 describing the types of failures that a blockchain enabled fault tolerant system may handle. The system may detect and/or anticipate system failures that may fall into at least three categories: processing or control parameter limit exceedances, symptomatic processing or control parameter state changes, and operational failures. Examples may include power or operating temperature going above or below a tolerance limit and/or set point; throughput fluctuating above or below above or below normal range, or changing at a rate indicative of an instability and/or impending failure; or a sudden throughput or resource stoppage. Any failure mode satisfying what may be such predefined criteria may require a network system processor's safe shutdown and a switch over to a redundant or back-up processor.

Further with respect to failure table 500 in FIG. 4, ledger failures may also occur. A block may be written incorrectly so that corresponding block Ns of a ledger pair are no longer identical and/or a ledger or a platform hosting a ledger may itself fail. Any failure mode satisfying what may be such predefined criteria may require a network system ledger's/ledger pair's/data storage device's safe shutdown and a switch over to a redundant or back up ledger/ledger pair/data storage device.

Figure 5:
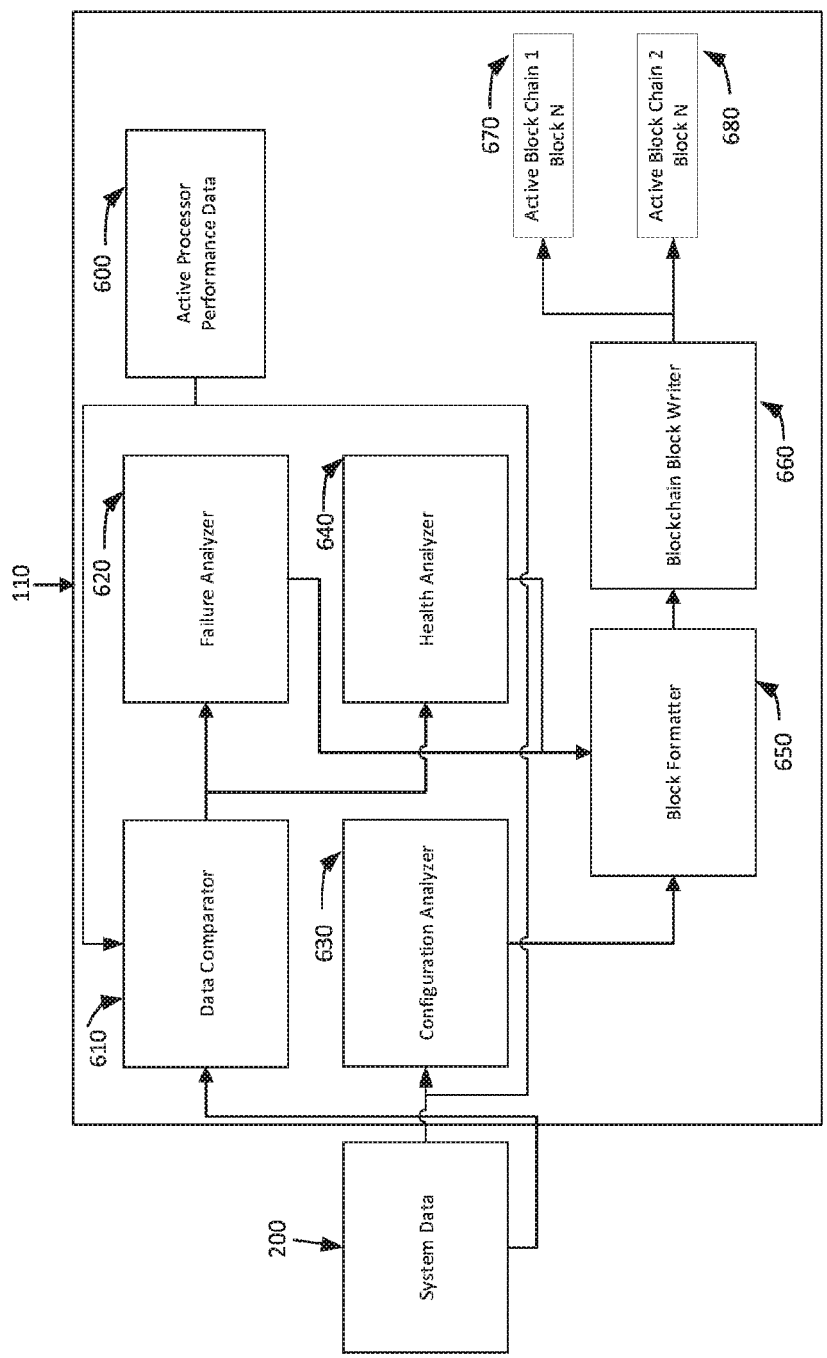
FIG. 5 is a schematic view of non-limiting embodiments or aspects of a monitoring elements in a blockchain enabled fault tolerance system according to the principles of the present disclosure.

According to non-limiting embodiments or aspects, in FIG. 5, the blockchain enabled network system data 200 is communicated to first processor node 110 in response to which several data analyses may be performed, the results of which may be formatted to be written on to first ledgers 300 and 350. A data comparator 610 may compare control parameter and health data from one time interval t to the next. Results from each comparison may be communicated to a failure analyzer 620 and a health analyzer 640, which may or may not be one and the same. Failure analyzer 620 may determine if the control and sensor data associated with control parameters remain within predefined network system control limits or if one or more have met one or more predefined failure indicators. Similarly, health analyzer 640 may assess the communicated sensor and control data to determine if any changes over time may signify one or more impending failures. The products of failure analyzer 620 analysis and health analyzer 640 analysis for each time interval t may be communicated to a block formatter 650, in response to which block formatter 650 may structure the received data according to structure 400 used within each block N 310 and 360 of first ledgers 310 and 350 comprising first ledger pair 140.

According to non-limiting embodiments or aspects, in FIG. 5, the first processor node's performance data 600 comprising its configuration, control and health data for each time interval t may be communicated to data comparator 610 in response to which it may be similarly processed by failure analyzer 620 and health analyzer 640, the results of which may be formatted according to block structure 400 by block formatter 650, communicated to ledger writer 660, and finally written as part of the time t N blocks 310 and 360 on first ledgers 300 and 350 that make up the first ledger pair 140.

Further to FIG. 5, configuration data received from network system data 200 and first processor performance data 600 may be segregated from control and health data by a configuration analyzer 630. Configuration analyzer data may determine if a configuration change occurs from one time interval t to the next. Configuration changes may be communicated to block formatter 650 so that they may be incorporated into block structure 400. Once the analysis results of failure analyzer 620, health analyzer 640, and configuration analyzer 630 are formatted according to block structure 400, block formatter 650 may communicate the structured data to a ledger writer 660 which may write N blocks 310 and 350 for time interval t on first ledgers 310 and 350 comprising first ledger pair 140.

Figure 6:
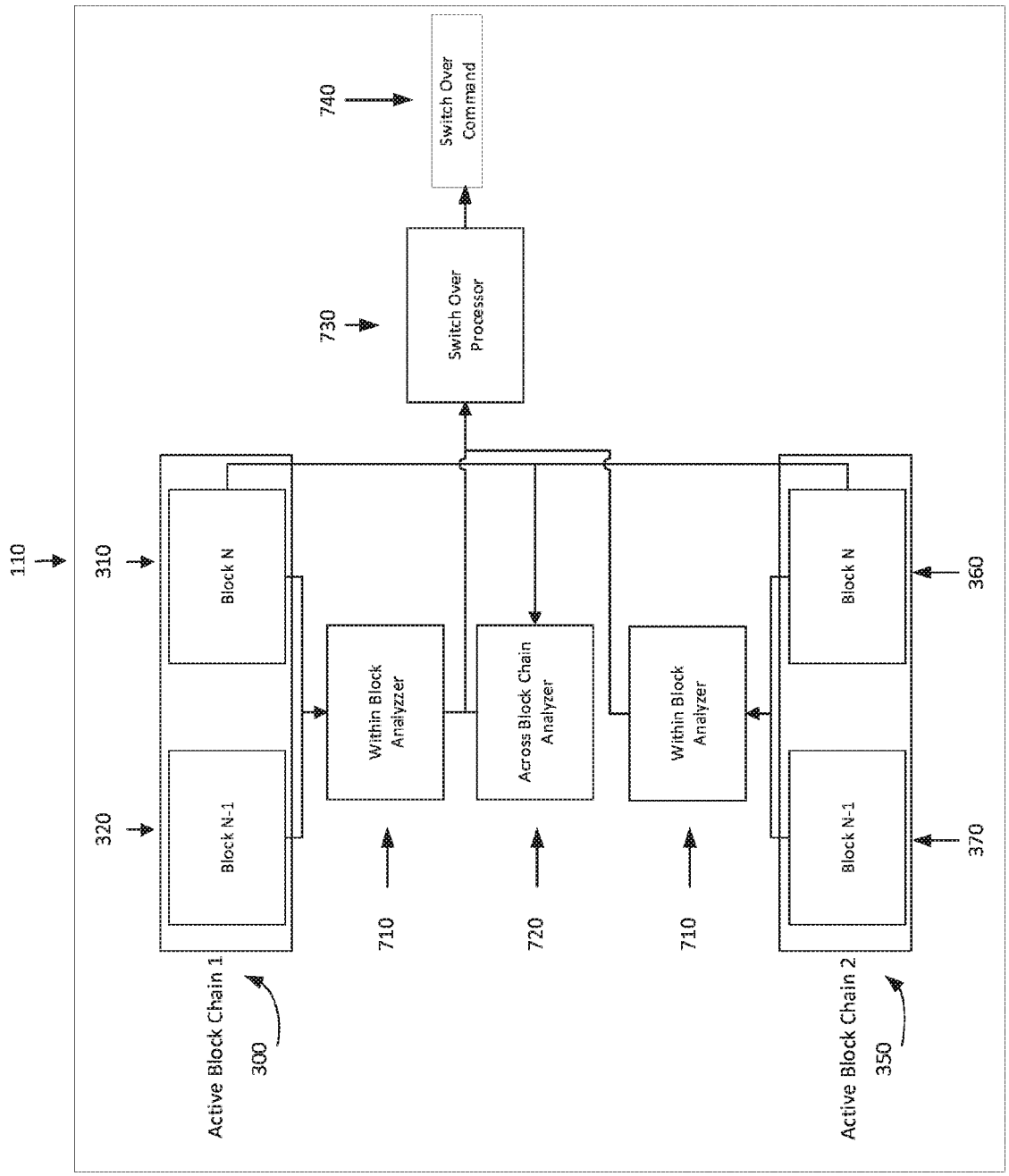
FIG. 6 is a schematic view of non-limiting embodiments or aspects of a distributed ledger monitoring elements in a blockchain enabled fault tolerance system according to the principles of the present disclosure.

According to non-limiting embodiments or aspects, FIG. 6 illustrates additional processing that may be performed by first processor node 110. While the non-limiting embodiments or aspects shown in FIG. 5 focus on analyses that may be performed to detect occurring or anticipated blockchain enabled network system 100 and first processor node 110 failures, the non-limiting aspect depicted in FIG. 6 highlights analyses that may be performed to detect one or more representative actual or pending within and/or across ledger failures that may occur and be detected by a blockchain enabled fault tolerant system.

According to non-limiting embodiments or aspects, FIG. 6 illustrates that across-block analyzer 720 may receive structured N block 310 and 360 data for time interval t. If the N block 310 and 360 data for time interval t are not the same, it may be assumed that first processor node 110 and/or ledger pair 140 either has or may be failing.

According to non-limiting embodiments or aspects, FIG. 6 further illustrates that within-block analyzer 710 may receive structured N-1 and N block data for active block 300 for time interval t and the time interval that preceded it. Similarly, within-block analyzer 715 may receive structured N-1 and N block data for active block 350 for time interval t and the time interval that preceded it. Within-block analyzers 710 and 715 may assess blockchain enabled network system and first processor node configuration, control, and health data changes between time intervals and identify if any meet criteria indicating an actual or anticipated failure.

Further to FIG. 6, outputs from within-block analyzers 710 and 715 and across-block analyzer 720 may be communicated to switch-over processor 730. When there is an indication that a ledger failure, a blockchain enabled network system failure, a first processor node failure, or any combination thereof may be occurring or may be anticipated to occur, switch-over processor 730 may instruct a switch-over command 740. If the indication a network system failure is occurring or anticipated, switch-over command 740 may instruct initiation of a fail-safe mode of operation. If the indication is that a first processor node 110 failure is occurring or anticipated, the switch-over command 740 may instruct that first processor node 110 be deactivated, that second processor node 120 initiate operation as the first processor node, that third processor node 130 be placed in a standby mode, and that another processor within plurality of processors 10 (e.g., one of the unnumbered processors appearing in FIG. 1) become the new third processor node.

If the indication is that one or more of the ledgers comprising first ledger pair 140 is failing or anticipated to fail, the switch-over command 740 may instruct that first ledger pair 140 be deactivated, that second ledger 150 be brought on as the first ledger pair, that third ledger pair 160 become the second ledger pair, and that another ledger pair within plurality of processors 10 (again one not shown in FIG. 1) become the new third ledger pair.

Whenever a first processor node 110 is deactivated, the last block N's structured data may be conveyed to the second processor node and used to boot it up to serve as the new first processor node of the blockchain enabled network system. Whenever a first ledger pair is deactivated, the last N-1 block's structured data may be conveyed to the new ledger pair as a block N for time interval t enabling it to serve as the new ledger pair of the blockchain enabled network system. It may then be used as an initial block N-1 for the subsequent time interval.

In response to any first processor node 110 and/or first ledger pair 140 being instructed to deactivate and a second processor node 120 and/or second ledger pair 150 to be activated, multi-party encryption technology may be used to compute new keys that may then be shared among the new first, second, and third processor nodes and/or ledger pairs. Thereby, the security of the newly comprised blockchain enabled network system 100 may be updated and preserved.

Figure 7:
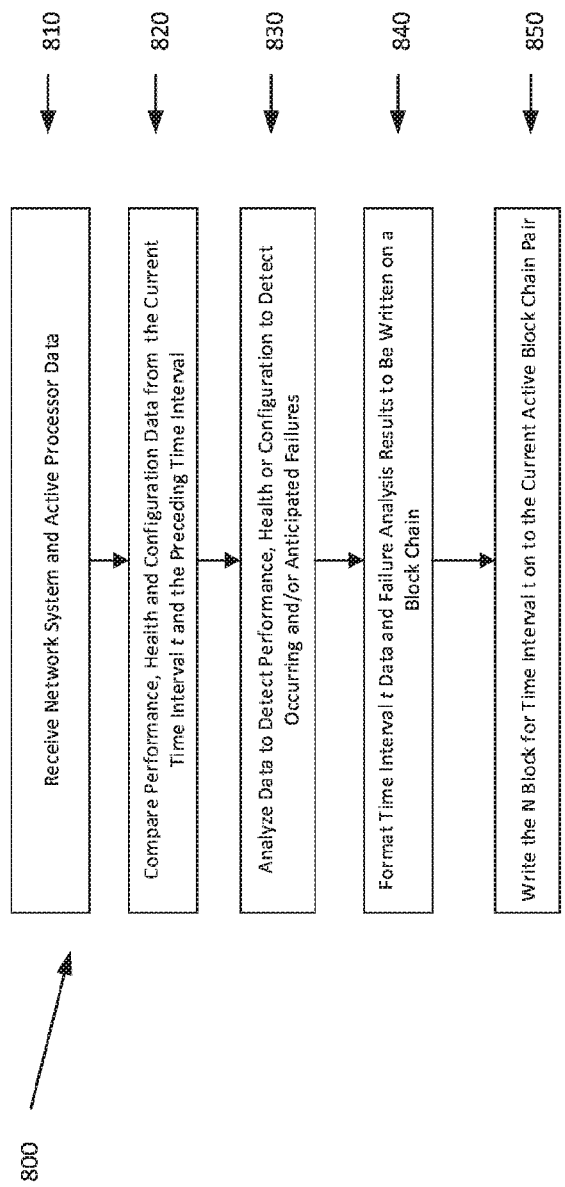
FIG. 7 is a process view of non-limiting embodiments or aspects of a blockchain enabled fault tolerance system according to the principles of the present disclosure.

According to non-limiting embodiments or aspects, FIG. 7 illustrates processing steps 800 that may be performed by blockchain enabled network system 100 in support of enabling it to operate fault tolerantly. In step 810 a first processor node may receive blockchain enabled network system and first processor node data for each time interval t, data which may then be compared to the previous time interval's data in step 820.

The comparative results produced by step 820 may be analyzed in step 830 to assess if a failure may have occurred or may be anticipated to occur. These failure results from step 830 and the data received in step 810 may next be formatted in step 840 so that they may be written onto a first ledger pair as block N for time interval t in accordance with block structure 400. In step 850 the N blocks may be written onto the currently first ledger pair.

Figure 8:
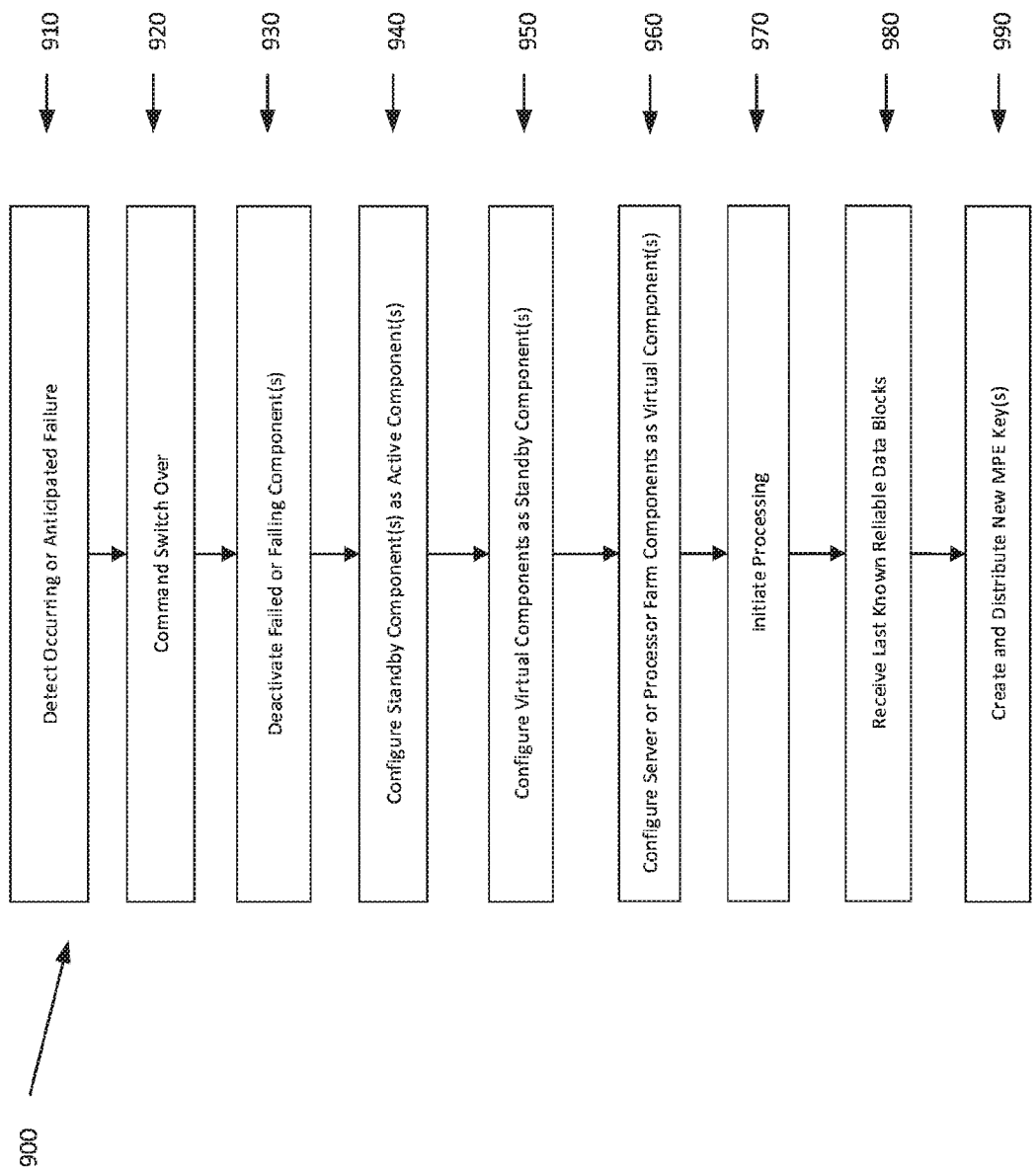
FIG. 8 is a process view of non-limiting embodiments or aspects of a blockchain enabled fault tolerance system according to the principles of the present disclosure.

According to non-limiting embodiments or aspects, FIG. 8 characterizes blockchain enabled network system reconfiguration steps 900 that may be performed when a first processor node failure, an first ledger pair failure, or any combination thereof occurs or may be anticipated. In step 910 the occurring or anticipated failure may be detected, in response to which a command may be communicated in step 920 which instructs that blockchain enabled network system 100 be reconfigured. In step 930, the failing processor node and/or ledger pair receives deactivation instructions. In step 940, a second processor node and/or ledger pair may be instructed to configure itself (themselves) as the new first processor node and/or ledger pair. Step 950 may then instruct the network's third processor node and/or ledger pair to become the new second processor node and/or ledger pair. Similarly step 960 then may instruct a processor and/or ledger pair within plurality of processors 10 to be configured as new third processor node and/or ledger pair. In step 970, the new first processor node and/or ledger pair are activated, leading to the newly activated devices reading and/or writing the last block of data that may be assumed reliable (either last block N and/or N-1, as the failures detected may require) in step 980. Finally, step 990 instructs new multiparty encryption keys be created and its shares distributed to the newly configured network system 100 to preserve and maintain its security.

Although non-limiting embodiments have been described in detail for the purpose of illustration based on what is currently considered to be the most practical and preferred embodiments or aspects, it is to be understood that such detail is solely for that purpose and that the disclosure not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment or aspect.

The invention claimed is:

1. A network system for handling fault tolerance in a blockchain enabled network system, comprising:
   a computing system programmed or configured with at least one of a plurality of processors arranged as an active processor node in the network system;
   at least one data storage device comprising a first ledger corresponding to a first blockchain and a second ledger corresponding to a second blockchain;
   at least one standby processor node in communication with the at least one data storage device;
   at least one standby data storage device; and
   the active processor node programmed or configured to:
      analyze and record blocks corresponding to data received through the network system on the first ledger and the second ledger, such that the first ledger and the second ledger have matching data;
      compare and analyze two blocks from the at least one data storage device to detect at least one failure or anticipated failure of the at least one active processor node, the at least one data storage device, or any combination thereof; and
      in response to detecting the at least one failure or anticipated failure, generating a switch-over command configured to cause the computing system to perform at least one of the following: switch from the active processor node to the at least one standby processor node such that the at least one standby processor node records the blocks received through the network system and is activated as a new active processor node, switch from the data storage device to the at least one standby data storage device, or any combination thereof.

2. The network system of claim 1, wherein the first blockchain and the second blockchain are separate forms of a same blockchain.

3. The network system of claim 1, wherein the data received from the network system relates to a network system's configurations, operations, control, processing, network functions, or any combination thereof.

4. The network system of claim 1, wherein multi-party encryption keys are created and shared among the active processor node, the at least one standby processor node, the at least one data storage device, and the at least one standby data storage device to establish a secure trust network system.

5. The network system of claim 1, wherein new multi-party encryption keys are created in conjunction with the switch-over command, in response to which portions of keys are distributed among activated and configured active and standby processor nodes and data storage devices comprising a reconfigured network system.

6. The network system of claim 1, wherein blocks of the first ledger and the second ledger for a same time interval are compared and analyzed to detect a failure or anticipated failure of the active processor node or the at least one data storage device.

7. The network system of claim 1, wherein upon a network system reconfiguration, a last trusted block of data is written to the first and second ledger of the at least one data storage device of a reconfigured network system.

8. A method comprising:
   analyzing, with at least one active processor node, a network system and active processor data;
   comparing and analyzing two blocks from at least one data storage device to detect, with at least one active processor node, at least one failure comprising at least one of the following: an occurring or anticipated system failure, an occurring or anticipated active processor node failure, an occurring or anticipated active data storage device failure, or any combination thereof;
   in response to detecting the at least one failure, issuing, with at least one processor node, a command to cause at least one of the following: a system shut down, a switch-over from a failed or anticipated to fail active processor node to a standby processor that activates as a new active processor node, a switch-over from a failed or anticipated to fail active data storage device to a standby data storage device that activates as an active data storage device, or any combination thereof; and
   in response to the command, at least one of the following: configuring a third processor of a plurality of processors as a standby processor node, configuring a third data storage device among a plurality of data storage devices as a standby data storage device, or any combination thereof.

9. The method of claim 8, wherein multi-party encryption keys are created and shared among the at least one active processor node, the standby processor, the active data storage device, and the standby data storage device to establish a secure, reconfigured trust network system.

10. The method of claim 8, further comprising:
    creating new multi-party encryption keys in conjunction with a switch-over command; and
    in response to creating the new multi-party encryption keys, distributing shares of the new multi-party encryption keys among the at least one active processor node, the standby processor nods, the active data storage device, and the standby data storage device to establish a secure, reconfigured trust network system.

11. The method of claim 8, wherein blocks of the first ledger and the second ledger for a same time interval are compared and analyzed to detect the failure of the at least one active processor node or the active data storage device.

12. The method of claim 8, further comprising writing a last trusted block of data to the active data storage device of a reconfigured network system in response to a network system reconfiguration.

13. The method of claim 8, wherein the command instructs the network system's configurations, operations, control, processing, network functions, or any combination thereof.

14. A computer program product comprising at least one non-transitory computer-readable medium including program instructions that, when executed, causes a blockchain enabled network system to:

detect a failure comprising at least one of the following: an active processor node failure, a data storage device failure, a ledger failure, or any combination thereof, wherein two blocks of a data storage device are compared and analyzed to detect the failure or an anticipated failure of an active processor node, an active data storage device, or any combination thereof; and in response to detecting the failure, issue a command to a standby processor node to cause the standby processor node to activate as an active processor node and/or to cause a standby data storage device to activate as an active data storage device.

15. The computer program product of claim 14, wherein blocks of the active data storage device for a same time interval are compared and analyzed to detect a failure or anticipated failure of the active processor node or data storage device.

16. The computer program product of claim 14, wherein upon a network system reconfiguration a last trusted block of data is written to the active data storage device of a reconfigured blockchain enabled network system.

17. The computer program product of claim 14, wherein the program instructions generate or perform the blockchain enabled network system's configurations, operations, control, processing, network functions, or any combination thereof.

* * * * *

UNITED STATES PATENT AND TRADEMARK OFFICE
CERTIFICATE OF CORRECTION

PATENT NO. : 11,914,488 B2
APPLICATION NO. : 17/774160
DATED : February 27, 2024
INVENTOR(S) : Jerry Wald It is certified that error appears in the above-identified patent and that said Letters Patent is hereby corrected as shown below:

In the Claims

Column 14, Line 49, Claim 10, after "processor" delete "nods,"

Signed and Sealed this
Thirtieth Day of April, 2024

Katherine Kelly Vidal
*Director of the United States Patent and Trademark Office*